Figure 1:
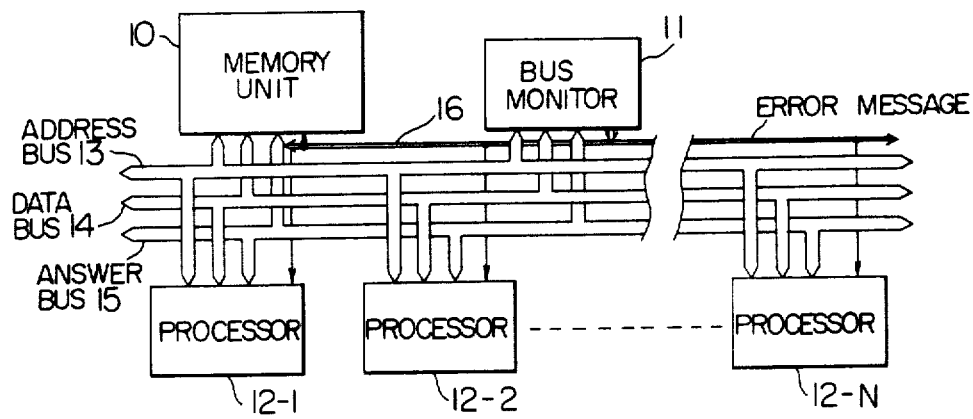

United States Patent [19]

Fukunaga et al.

[11] Patent Number: 4,523,272
[45] Date of Patent: Jun. 11, 1985

[54] BUS SELECTION CONTROL IN A DATA TRANSMISSION APPARATUS FOR A MULTIPROCESSOR SYSTEM

[75] Inventors: Yasushi Fukunaga, Hitachi; Tadaaki Bandoh, Ibaraki; Ryosei Hiraoka; Hidekazu Matsumoto, both of Hitachi; Jushi Ide, Mito; Tetsuya Kawakami, Hitachi, all of Japan

[73] Assignees: Hitachi, Ltd.; Hitachi Engineering Co., Ltd., both of Tokyo, Japan

[21] Appl. No.: 366,785

[22] Filed: Apr. 8, 1982

[30] Foreign Application Priority Data

Apr. 10, 1981 [JP] Japan .................. 56-52948
Apr. 10, 1981 [JP] Japan .................. 56-52949
Apr. 17, 1981 [JP] Japan .................. 56-57226

[51] Int. Cl.$^3$ .................. G06F 15/16; G06F 15/40
[52] U.S. Cl. .................. 364/200
[58] Field of Search ... 364/200 MS File, 900 MS File

[56] References Cited

U.S. PATENT DOCUMENTS

| 3,810,114 | 5/1974 | Yamada. | |
|---|---|---|---|
| 3,876,987 | 4/1975 | Dalton et al. | 364/200 |
| 4,096,572 | 6/1978 | Namimoto | 364/200 |
| 4,131,941 | 12/1978 | Siegel et al. | 364/200 |
| 4,232,366 | 11/1980 | Levy et al. | 364/200 |
| 4,394,731 | 7/1983 | Flusche et al. | 364/200 |

Primary Examiner—Harvey E. Springborn
Attorney, Agent, or Firm—Antonelli, Terry & Wands

[57] ABSTRACT

In a multiprocessor system having a main memory and a plurality of processors connected through common address bus, data bus and answer bus for data transfer, a data transmission apparatus is provided for each of the main memory and the processors and includes bus request control lines for transferring bus request signals and bus control signals, and a bus controller for separately controlling selections of the address bus, the data bus and the answer bus in response to the signals on the bus request control lines and the request signal. Overlapped processing such as data write and data write answer or data read and data read answer in one cycle is possible.

12 Claims, 6 Drawing Figures

BUS SELECTION CONTROL IN A DATA TRANSMISSION APPARATUS FOR A MULTIPROCESSOR SYSTEM

The present invention relates, in general, to a data transmission apparatus for a multiprocessor system, and more particularly to a bus selection control for a data transmission apparatus having at least one memory unit and a plurality of processors connected through a common bus for transmitting data between the memory unit and the processors and between the processors.

Such a data transmission apparatus is also referred to as a data transmission system.

The processors are in many cases computers. In such cases, the data transmission apparatus (data transmission system) is also referred to as a computer system or a data processing system.

In the present specification, the terms "data transmission apparatus", "data transmission system" and "computer system" are used interchangeably.

In recent years, as the operation speed of computer systems is increased, the data transmission between the memory unit and the processors is usually carried out in a synchronous single bus configuration in which data and address signals are transmitted by dividing a common bus (single signal transmission bus), which is shared for use as an address bus, a data bus and an answer bus, by the same time slot. For example, reference is made to U.S. Pat. No. 4,232,366 to Levy et al.

However, in the prior art system, since not only the common bus is shared by the processors, but also the signals including the addresses, data to be transmitted between the processors and the answers to the data transmission are transmitted on a shared basis, the improvement of the throughput of the common bus is restricted.

In the data transmission between the memory unit and the processors, it is common to transfer information having a parity bit added thereto.

In the prior art, the processors are provided with a parity check circuit for checking for the presence or absence of parity error. As the number of processors installed increases, the increase in the cost of the hardware for the parity check circuit becomes significant. An example of a parity checker is the Texas Instruments Inc. Type SN 74280 IC.

It is, therefore, an object of the present invention to provide a data transmission apparatus for a multiprocessor system, particularly for a distributed function multiprocessor system having an improved bus throughput.

It is another object of the present invention to provide a data transmission apparatus for a multiprocessor system which does not need an error check circuit for each processor.

It is a further object of the present invention to provide a data transmission apparatus for a multiprocessor system having a reduced number of bus selection lines without reducing the bus throughput.

In accordance with one feature of the present invention, the common bus includes at least an address bus, a data bus and an answer bus, and the processors and the memory unit have their own selection request line to the common bus so that they can individually occupy the address bus, the data bus or the answer bus in response to the coincidence of a vacant state on the bus and a bus request thereto. Accordingly, each of the buses is provided with its own bus selection control unit.

In accordance with another feature of the present invention, when each of the processors issues a bus selection request, it selects the address bus, the data bus or the answer bus depending on whether the content of the request relates to (a) data write, (b) data read, (c) answer to the data write or (d) answer to the data read.

In accordance with a further feature of the present invention, a bus monitoring unit is provided on the common bus to check for a transmission error on the common bus, and if the error is detected, to send error information to a least the processor which is transmitting the data. Since the error on the bus is checked at one unit and the transmission/reception units receive only the result of the error check, each of the units need not have its own error check circuit. Accordingly, less hardware is needed as compared to the prior art system.

In accordance with a still further feature of the present invention, the processors having considerably lower frequency of usage of the bus than that of the other processors in the system have request signal lines which are shared for lower frequency of usage of the bus, in order to reduce the required number of bus request lines.

Figure 2:
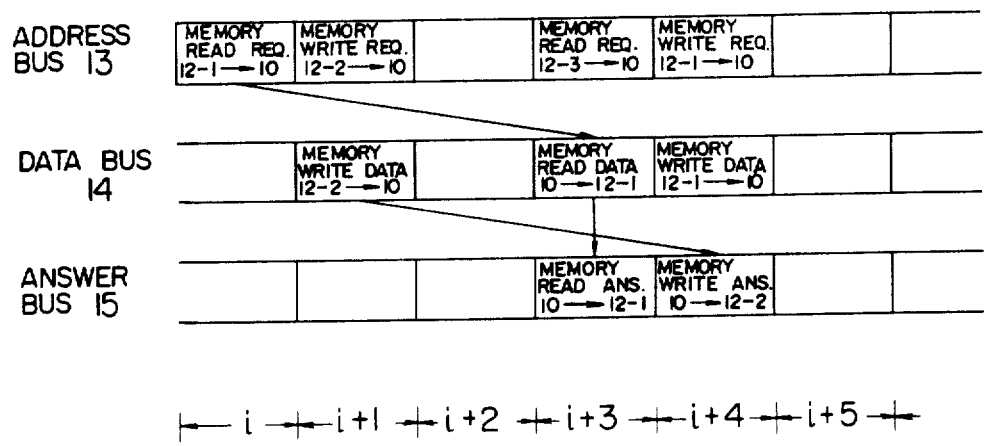
Figure 3:
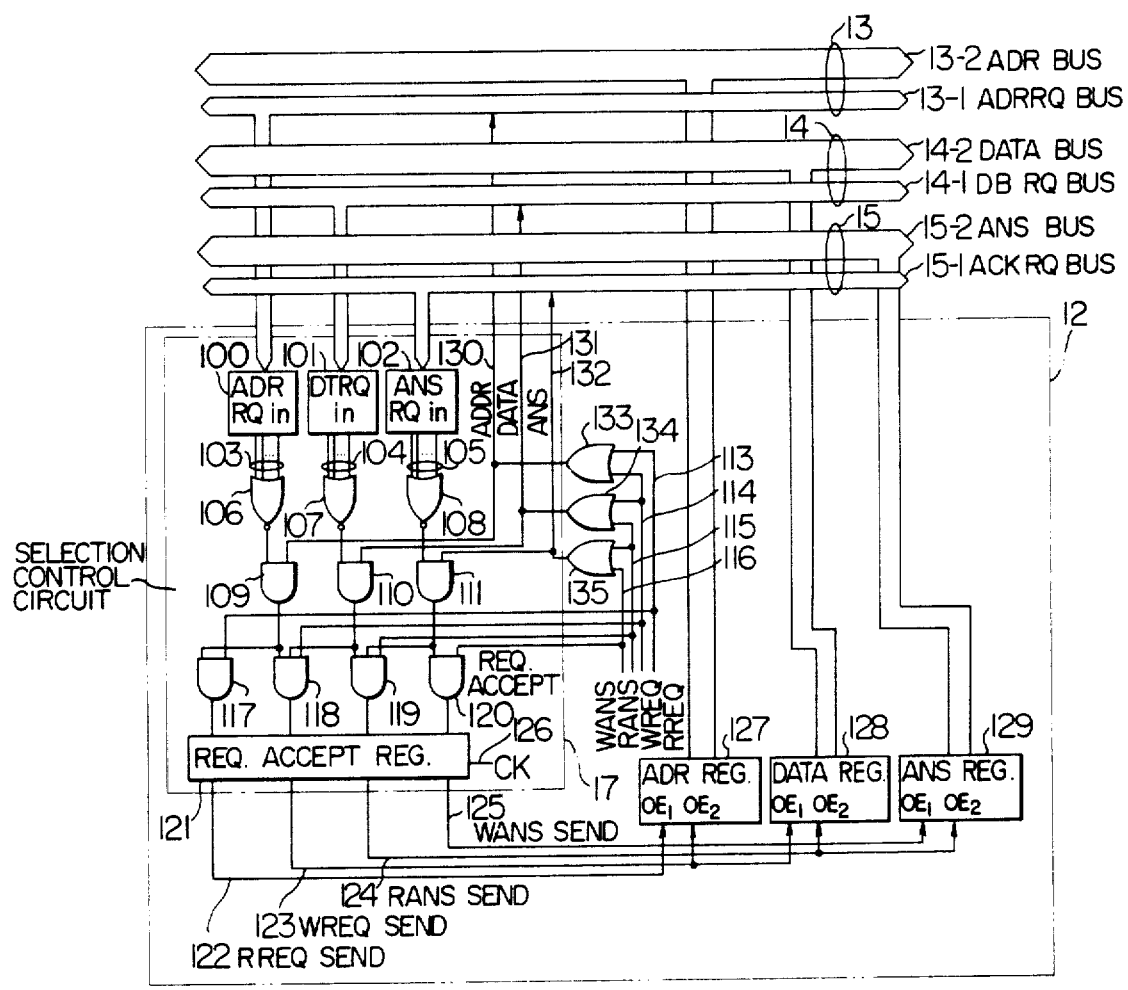
Figure 4:
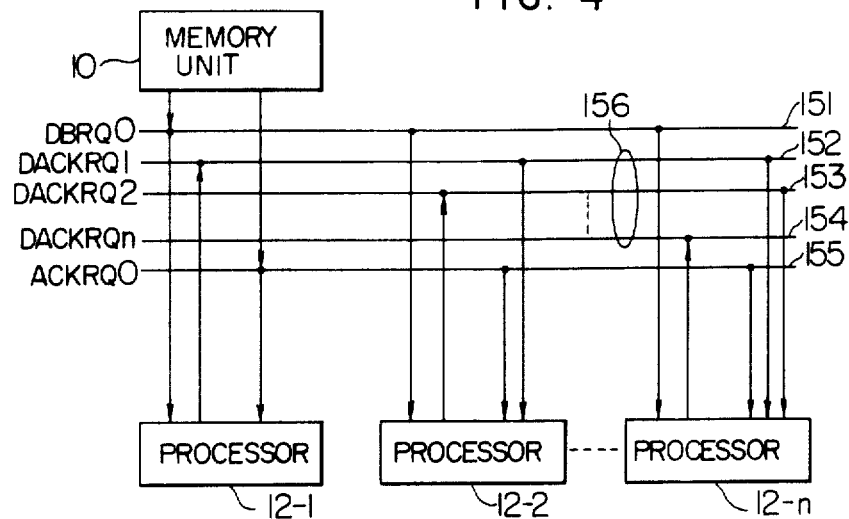
Figure 5:
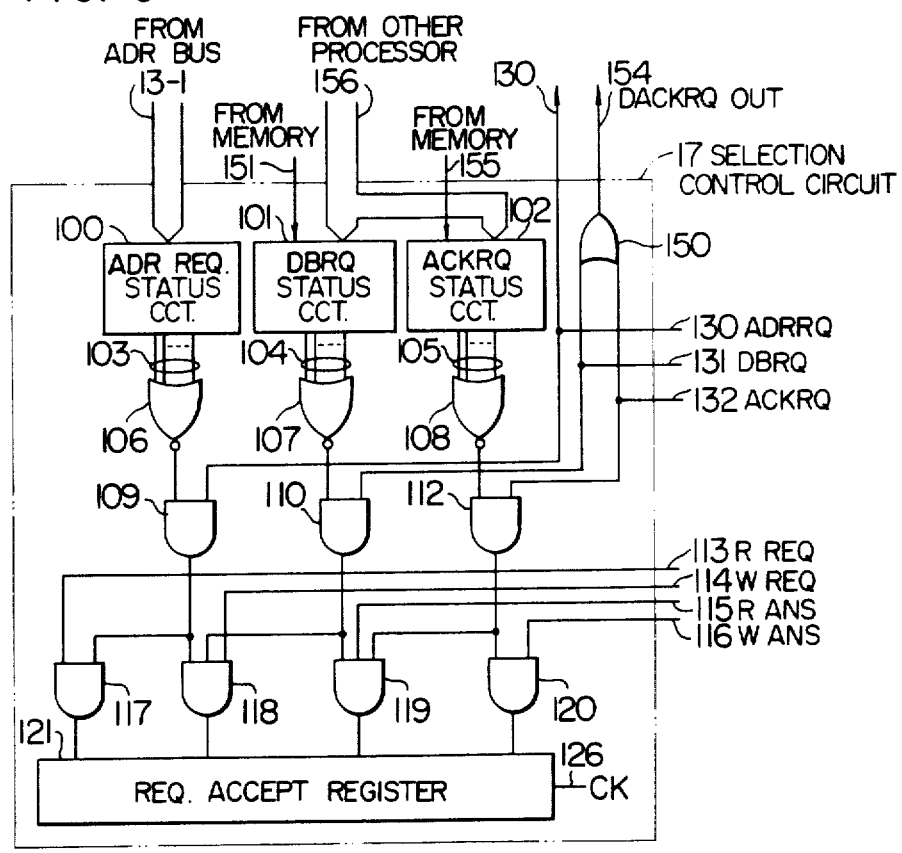
Figure 6:
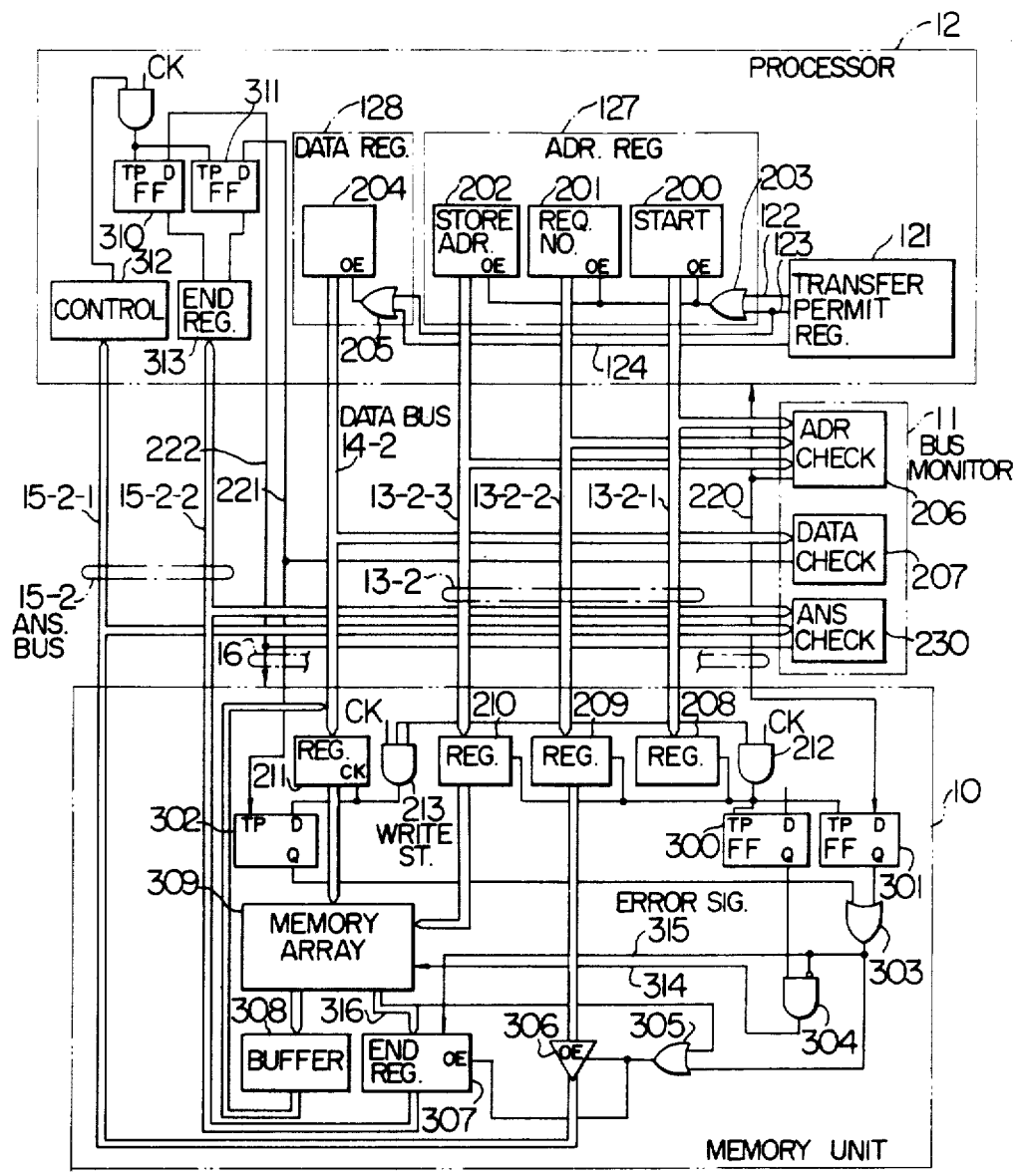

The embodiments of the present invention will now be explained in detail with reference to the accompanying drawings, in which:

FIG. 1 shows an overall configuration of a data transmission apparatus in accordance with the present invention, FIG. 2 shows a time chart for illustrating data transmission, FIG. 3 shows a relationship between a selection control circuit of a processor connected to the data transmission apparatus and an external interface, FIG. 4 shows connection of request signals when the request signals to the buses are reduced depending on the frequency of the request, FIG. 5 shows a configuration of a selection control circuit for FIG. 4, FIG. 6 shows data transfer registers in a processor and a memory unit and a bus monitoring unit.

Referring to FIG. 1 which shows the overall configuration of one embodiment of the data transmission apparatus of the present invention, numeral 10 denotes a memory unit, usually a main memory, which includes a memory array and a memory controller, numeral 11 denotes a bus monitor, numeral 12 (12-1–12-3) denotes a processor such as a job processor, an I/O processor or a file processor in a distributed function multiprocessor system, numeral 13 denotes an address bus which includes an address bus request line, numeral 14 denotes a data bus which includes a data bus request line, numeral 15 denotes an answer bus which includes an answer bus request line and numeral 16 denotes an error message signal line.

Each of the processors 12 uses those three buses in an efficient manner to transfer data between it and the memory unit 10. The buses are used in the following way.

TABLE 1

| Bus Allocation | Processor Ans./Req. | | | |
| --- | --- | --- | --- | --- |
| | (a) Data Write Request | (b) Data Write Answer | (c) Data Read Request | (d) Data Read Answer |
| 1. Address Bus | o | | o | |
| 2. Data Bus | o | | | o |
| 3. Answer Bus | | o | | o | where o indicates the usage of the bus.

As seen from the above table 1, the three combinations, the data write request (a) and the data write answer (b), the data read request (c) and the data read answer (d), and the data write answer (b) and the data read request (c), use different buses and hence they can be simultaneously executed in the same time slot. The manner of the simultaneous operation is shown in a time chart of FIG. 2.

In a time slot i, a memory read request is issued from the processor 12-1 to the memory unit 10 through the address bus 13. In a time slot i+1, a memory write request is issued from the processor 12-2 through the address bus 13 and the data bus 14. In a time slot i+3, an answer to the memory read request issued in time slot i is sent back through the data bus 14 and the answer bus 15. At this time, a memory read request from the processor 12-3 can be issued through the address bus 13. In a time slot i+4, an answer to the memory write request issued in the time slot i+1 is issued through the answer bus 15. At this time, a memory write request from the processor 12-1 can be issued.

In such a bus selection, the bus selection system is a key factor.

The selection control system may be a distributed system in which bus selection control circuits are distributed in the processors and the memory unit. The distributed system is explained below.

FIG. 3 shows the details of a selection control circuit 17 for the processor 12, and the connection thereof to the buses 13-15. When the processor 12 is to transmit data, it sends a read request (RREQ) 113, a write request (WREQ) 114, a read answer request (RANS) 115 or a write answer request (WANS) 116, depending on the type of request by the processor 12, to a gate 133, 134 or 135, one time slot before the transfer. The gates 133, 134 and 135 form a translator for the selection request signals which translates the request signals to an address bus selection request signal 130, a data bus selection request signal 131 and an answer bus request signal 132 in accordance with the logic shown in the table 2 below. The sources of the request signals may be the memory unit, the control circuits or microprograms.

TABLE 2

| | Address Bus Selection Request | Data Bus Selection Request | Answer Bus Selection Request |
| --- | --- | --- | --- |
| Read Request | 1 | 0 | 0 |
| Write Request | 1 | 1 | 0 |
| Read Answer Request | 0 | 1 | 1 |
| Write Answer Request | 0 | 0 | 1 |

The other processors and the memory unit also issue similar request signals which are sent to the selection control circuit 17 through a bus 13-1 comprising the address bus selection request lines, a bus 14-1 comprising the data bus selection request lines and a bus 15-1 comprising the answer bus selection request lines.

The selection control circuit 17 receives the request signals by request signal receivers 100-102 and accepts only the request from the unit having a higher priority than that imparted to its own unit. Output signals 103-105 of the request signal receivers 100-102 are examined by gates 106-108 which form a priority circuit to check to see if the request is from the higher priority unit or not.

If the request is not from a higher priority unit and a request signal 130-132 of its own unit is active, the gate 109-111 is opened. Gates 117-120 operate in the following manner.

(1) If the request is a read request and the selection of the address bus is accepted by the gate 109, the gate 117 is opened.

(2) If the request is a write request and the selections of the address bus and the data bus are accepted by the gates 109 and 110, respectively, the gate 118 is opened.

(3) If the request is a read answer and the selections of the data bus and the answer bus are accepted by the gates 110 and 111, respectively, the gate 119 is opened.

(4) If the request is a write answer and the selection of the answer bus is accepted by the gate 111, the gate 120 is opened.

The outputs from the gates 117-120 are loaded into a register 121 by a clock signal 126 at the end of the time slot. The above operations are carried out at least one time slot before the transfer. In the transfer time slot, if the register 121 produces a read request transfer grant signal 122, the contents of an address register 127 are sent out to address signal bus 13-2. If the output of the register 121 is a write request transfer grant signal 123, the contents of the address register 127 and a data register 128 are sent out to address signal bus 13-2 and data signal bus 14-2, respectively.

If the output is a read answer transfer grant signal 124, the contents of the data register 128 and an answer register 129 are sent out to the data signal bus 14-2 and an answer signal bus 15-2, respectively.

If the output is a write answer transfer grant signal 125, the contents of the answer register 129 are sent out to the answer signal bus 15-2.

As described above, since only the bus to be used by the type of data transfer requested is selected, the lower priority unit can transmit data through an unselected bus so that the bus throughput is improved.

In the embodiment explained above, it is assumed that the data transfers between the processors and between the memory unit and the processor have the same transfer request and hence the answer lines from the processors are selected. In general, in the configuration shown in FIG. 1, the memory requests from the processors and the answer from the memory unit occupy most of the load. Accordingly, the provision of the answer bus selection request signal bus 15-1 in each unit may lead to an increase of the number of signal lines when the number of processors 12 is large. The frequency of the usage of the buses is generally shown in Table 3 below.

TABLE 3

| | Address Bus | Data Bus | Answer Bus |
|---|---|---|---|
| Memory | Not used | High | High |
| Processor | High | High | Low |

Thus, as to the answer bus, an exclusive request line may be provided for the memory unit having a high frequency of usage while the request line for the processors having a low frequency of usage may be shared with the data bus selection request line.

The output system for the selection request lines is shown in Table 4 below.

TABLE 4

| | Memory | | | Processor | |
|---|---|---|---|---|---|
| | | | | | Data- |
| | Address Bus Request | Data Bus Request | Answer Bus Request | Address Bus Request | Answer Bus Request |
| Read Request | — | — | — | 1 | 0 |
| Write Request | — | — | — | 1 | 1 |
| Read Answer | 0 | 1 | 1 | 0 | 1 |
| Write Answer | 0 | 0 | 1 | 0 | 1 |

The memory has a higher priority than the processors.

In such a system, the connection between the data bus selection request signal bus 14-1 and the answer bus selection request signal bus 15-1 is more complex than that shown in FIGS. 1 and 3. It is shown in FIG. 4.

Referring to FIG. 4, the memory unit 10 issues a DBRQO signal 151 which is one of the data bus request signals when the data bus is to be selected, and an ACK-RQO signal 155 which is one of acknowledge request lines when the answer bus is to be selected.

On the other hand, the processor 12 issues a DACK-RQi (i=1—n) signal (data bus and acknowledge bus request i) 152-154 which is a corresponding one of selection request signals 156 allotted to the processor 12 when either the data bus or the answer bus is to be selected.

The selection control circuit 17 of the memory unit and the processor is constructed as shown in FIG. 5. It differs from FIG. 3 in that the request signals 151 and 155 are separately supplied to the data bus request signal receiver 101 and the answer bus request receiver 102 but the selection request signals 156 from the processors are supplied commonly.

At the output of the request signals, the data bus request signal 131 and the answer bus request signal 132 are Ored by a gate 150.

In this manner, the number of the request lines from the processors are reduced to two, the address bus request line 130 and the data and answer bus request line 154, and the data transfer between the memory unit and the processor can use the address bus, the data bus and the answer bus is an efficient way depending on the type of transfer, that is, the read, write, read answer and write answer operations.

The selection control system has thus far been described. Whichever system is used, information indicating whether the transfer is permitted in the next time slot is set in a register 121 in the selection control shown in FIG. 3 or 5 (see FIG. 2).

The procedure for the granted information transfer is now explained. The content of the data transferred differs depending on the type of transfer but the procedure of the transfer is identical. As an example, the procedure for the data write request transfer is explained.

FIG. 6 shows a construction of data transfer registers in a sending station and a receiving station and a bus monitor 11 for checking an error. FIG. 6 shows an example in which the memory write request is issued from the processor 12 to the memory unit 10.

When the processor 12 acquires a right to select the address bus 13 and the data bus 14, one of transfer grant signals 122-124, e.g. signal 123, at the output of the transfer grant register 121 is "1". As a result, a gate 203 in address register 127 and a gate 205 in data register 128 is conditioned so that the data stored in the register 127 and 128 is sent out to the address signal bus 13-2 and the data signal bus 14-2, respectively.

The address signal bus 13-2 comprises a start function signal bus 13-2-1, a requesting unit address signal bus 13-2-2 and a memory address signal bus 13-2-3.

The memory unit 10 decodes the signal sent from the start function signal bus 13-2-1 by gates 212 and 213. When the start function specifies a memory start, the gate 212 is conditioned to load the signals on the address signal bus 13-2 into a corresponding register 208, 209 and 210. When the start function specifies a memory write, the gate 213 is conditioned to load the signal on the data signal bus 14-2 into a register 211.

In order to enhance reliability, parity bits are added to the address signal bus 13-2 and the data signal bus 14-2. The parity check is carried out by an address signal check circuit 206 and a data signal check circuit 207 in the bus monitor 11 in the following manner.

The address signal check circuit 206 reads in the signal on the address signal bus 13-2 and checks a parity for each time slot and sends out a check result or an address parity error signal 220 to the memory unit 10 and the processors 12.

The memory 10 and the processors 12 which transmit and receive the address data through the address signal bus 13-2 check the address parity error signal 220 to determine if the data was transferred correctly.

The data signal check circuit 207 reads in the signal on the data signal bus 14-2 and carries out the parity check for each time slot and sends out a check result or a data parity error signal 221 to the memory unit 10 and the processors 12.

The memory 10 and the processors 12 which transfer the data through the data signal bus 14-2 check the data parity error signal 221 to determine if the data was transferred correctly.

The correctness of the data transfer is determined in the following manner depending on the type of data sent.

TABLE 5

| Time of Error Detection | Process |
|---|---|
| Request of Data | The subsequent processes are stopped and a bus parity is sent back as an answer data. |
| Answer to Data | A bus parity is added to an error information of the answer data |

The above process is carried out in the receiving unit and no process is carried out in the sending unit. For example, when the information is transferred from the processor to the memory unit, the memory unit is the receiving unit.

The above process is explained with reference to FIG. 6.

The memory unit 10 loads the memory request into the register 208-211 by the gate 212 or 213. The gate 212 also sets flip-flops 300 and 301 which produce a parity error signal fetch signal and a memory start signal, respectively. The gate 213 which receives the write request to the memory 10 sets the data parity error into a flip-flop 302.

A start signal 314 starts the data write to a memory array 309 in the memory write operation. The output of the flip-flops 301 and 302 are ORed by a gate 303. When an error exists, the start signal 314 to the memory array 309 is inhibited by a gate 304 and the process is terminated. On the other hand, when an error exists, the content of a buffer 306 which contains the requesting unit address and the content of an end signal buffer 307 are sent out to the answer bus 15-2 by a gate 305. Since the error signal 315 has been sent to the end signal register 307, the occurrence of the error is communicated to the requesting unit.

On the other hand, in a normal condition, the memory array 309 produces an end signal 316 to condition the gate 305 so that the contents of the buffer 306 and the end signal buffer 307 are sent out to the answer bus 15-2. In the memory read operation, the data buffer 308 is activated and the read data is sent out to the data signal bus 14-2. That data is checked by the answer signal check circuit 230 and the data signal check circuit 207.

When an error exists, a control circuit 312 compares the requesting unit address on the bus 13-2-2 with the address of its own unit, and if they are equal, sets the flip-flops 310 and 311. When the control circuit 312 operates in the processor 12 having the requesting unit address, the answer parity error signal 222 and the data parity error signal 211 are set into the flip-flops 310 and 311 and the contents thereof are added to the error information in an end signal register 313.

In this manner, the error signal on the bus can be transmitted to the requesting unit.

As described hereinabove, according to the present invention, only the bus necessary for the requested data transfer is selected so that the lower priority unit can transmit data through an unselected bus. Accordingly, the bus throughput is improved.

What is claimed is:

1. A data transmission apparatus for a multiprocessor system comprising at least one memory unit; a plurality of processors; synchronous common bus means including at least an address bus, a data bus and an answer bus connected between said memory unit and said processors for transferring data therebetween; and bus control means provided in each of said processors and said memory unit for controlling the use of said common bus means, said common bus means further including bus request control lines, associated with said address bus, said data bus and said answer bus and connected to the bus control means in said memory unit and each of said processors, for requesting use of a bus of said common bus means; and each said bus control means including selection means connected to said separate bus request control lines for controlling use of one or more of the buses of said common bus means by the memory unit or processor in which the selection means is provided in response to bus status signals received via said bus request control lines and bus request signals generated in the memory unit or processor in which the selection means is provided, such that a data read request is transmitted through only the address bus, a data write request is transmitted through the address bus and the data bus, a read answer is transmitted through the data bus and the answer bus and a write answer is transmitted through only the answer bus when said buses are not in use as indicated by said received bus status signals, whereby said memory unit and said processors may separately select said address bus, said data bus and said answer bus, if not in use by the memory unit or a processor, to transfer data address and answer signals to permit simultaneous use of different buses of said common bus means by more than one processor or by said memory unit and a processor for read, write and answer operations.

2. A data transmission apparatus according to claim 1, wherein each bus control means further includes request signal issuing means for issuing to said bus request control lines selection request signals which serve as said bus status signals indicating the availability of said address bus, said data bus and said answer bus to the memory unit and processors connected to the common bus means, and said selection means includes granting means for generating granting signals to enable application of data to the bus from the memory unit or processor in which the selection means is provided in response to said selection request signals, said request signal issuing means including means for issuing an address bus request signal and a data bus request signal simultaneously for a data write request and issuing only an address bus request signal for a data read request.

3. A data transmission apparatus according to claim 1 or 2 wherein said request signal issuing means of said bus control means includes answer bus request signal issuing means for issuing to corresponding bus request control lines only an answer bus request signal for effecting answer to a data write operation, and an answer bus request signal and a data bus request signal for the effecting answer to a data read operation.

4. A data transmission apparatus according to claim 1 wherein said memory unit and said processors in said multiprocessor system operate with a bus selection control cycle and a data transfer cycle in such a way that said memory unit and said processors execute bus selection control in a first operation cycle and the bus requesting unit which is successful in selecting the bus transfers the data in the next operation cycle while permitting another requesting unit to execute bus selection control for the next data transfer, whereby an overlapped processing in one operation cycle is permitted.

5. A data transmission apparatus according to claim 1 wherein said address bus, said data bus and said answer bus have a common bus monitoring means for detecting a transmission error on the respective buses, said bus monitoring means including means responsive to detection of a transmission error for sending out error information to at least the data transferring memory unit or processor.

6. A data transmission apparatus according to claim 1 further comprising interface means for combining the bus request control lines for connection to said processors in accordance with the frequencies of usage of the bus by the respective processors.

7. A data transmission apparatus according to claim 1, characterized in that said memory unit is connected with a bus request control line for requesting a data bus and an answer bus individually, each of said processors is connected with a bus request control line for requesting an address bus and a bus request control line for requesting a data bus and an answer bus, wherein said processor issues an address bus, a data bus and an answer bus request signal for an address bus request signal upon a data write or read request, respectively, said memory unit issues an answer bus request signal or an answer bus and a data bus request signal upon an answer request to the write or read request, and said processor issues a data bus and an answer bus request signal upon an answer request to the read request.

8. A data transmission apparatus for a multiprocessor system including at least one memory unit; a plurality of processors, and synchronous common bus means including at least an address bus, a data bus and an answer bus connected between said memory unit and said processors and between said processors for effecting the transfer of address, data and answers signals therebetween during date read and data write operations, and bus request control lines connected to said memory unit and said processors for requesting use of individual buses of said common bus means; each of said processors including request signal issuing means for issuing to individual bus request control lines selection request signals to indicate request for use of individual buses of said common bus means; and said memory unit and each of said processors including storing means for individually storing address, data and answer signals, and bus control means responsive to internal selection request signals issued in the memory unit or processor in which the bus control means is provided and the availability for use of a selected bus or buses of said common bus means as indicated by the presence or absence of selection request signals on said bus request control lines for enabling application of signals from said storing means to said selected bus or buses so as to permit simultaneous use of different buses of said common bus means by more than one processor or by said memory unit and a processor for read and write operations on the basis of availability of said buses.

9. A data transmission apparatus according to claim 8, wherein each bus control means comprises bus status determining means connected to said bus request control lines for detecting the absence of selection request signals on said bus request control lines as an indication of the availability for use of the individual buses of said common bus means, and selection means responsive to said bus status determining means and said internal selection request signals issued in the memory unit or processor in which the bus control means is provided for generating send control signals to enable said storing means to apply the signals stored therein to the buses of said common bus means required by said internal selection request signals.

10. A data transmission apparatus according to claims 8 or 9, wherein said processors include means providing individual request signals designating respective data read and data write operations which require use of one or more of the buses of said common bus means, and wherein said request signal issuing means including translator means responsive to said individual request signals for applying selection request signals to said bus request control lines to indicate a request for use of those buses of the common bus means required for the data read or data write operation designated by an individual request signal.

11. A data transmission apparatus according to claim 10, wherein said storing means in each processor includes an address register, a data register and an answer register connected to said address bus, said data bus and said answer bus, respectively, and said selection means includes means for applying said send control signals to enable selected ones of said address register, said data register and said answer register to apply the signals stored therein to said respective buses of said common bus means in accordance with the selection request signals received from said translator means.

12. A data transmission apparatus according to claim 8, wherein respective bus request control line is provided for each of said buses of said common bus means.

* * * * *